United States Patent
Carpenter, Jr.

[15] 3,640,391
[45] Feb. 8, 1972

[54] AQUARIUM ACCESSORIES WITH SELF-STARTING WATER-CIRCULATING SYSTEMS

[72] Inventor: Paul David Carpenter, Jr., 1112 Burr Street, Algonquin, Ill. 60102

[22] Filed: Aug. 27, 1969

[21] Appl. No.: 853,388

[52] U.S. Cl............................................................210/169
[51] Int. Cl.....................................................E04h 3/20
[58] Field of Search.................210/169, 167, 120, 472, 188; 119/5; 250/43

[56] References Cited

UNITED STATES PATENTS

| | | | |
|---|---|---|---|
| 2,669,661 | 2/1954 | Riddifold et al. | 250/43 |
| 2,648,774 | 8/1953 | Whitlock | 250/43 |
| 2,783,893 | 3/1957 | Romanoff | 210/169 X |
| 3,485,576 | 12/1969 | McRae et al. | 250/43 X |
| 2,822,925 | 2/1958 | Lambertson | 210/169 |

FOREIGN PATENTS OR APPLICATIONS

| | | | |
|---|---|---|---|
| 69,956 | 3/1963 | Germany | 210/169 |

*Primary Examiner*—Reuben Friedman
*Assistant Examiner*—T. A. Granger
*Attorney*—Darbo, Robertson & Vandenburgh

[57] ABSTRACT

Self-starting, quiet, surge-free circulation of aquarium water to an accessory such as a filter or germicidal lamp is achieved by a system including an airlift into a substantially airtight accessory where the air and water are trapped so as to provide a pressure to lift the water out of the accessory. Air other than the quantity remaining trapped is bled through a constricted passage into the outflowing water tube, and appears to aid its outflow by a blowing action resembling an airlift.

9 Claims, 6 Drawing Figures

PATENTED FEB 8 1972 3,640,391

INVENTOR
PAUL DAVID CARPENTER, JR
By Darbo, Robertson & Vandenburgh
Attorneys

AQUARIUM ACCESSORIES WITH SELF-STARTING WATER-CIRCULATING SYSTEMS

BACKGROUND OF THE INVENTION

In maintaining the water in an aquarium in optimum condition for the well-being of the aquatic collection residing therein, it is customary to continuously circulate the water through purifying accessories; such as filters and germicidal radiation devices. It is also customary to provide for continuous bubbling of air into the aquarium water. The latter not only maintains the oxygen level in the water, but equally importantly assists in the elimination of dissolved, volatile waste products such as carbon dioxide.

Though the relatively inexpensive air pumps which are commercially available for use with aquariums are extremely simple and dependable in their operation, other aquarium accessories are generally far less simple and dependable than they should be. For example, many aquarium accessories must be carefully filled or primed with water before starting their operation. Continued operation of some accessories is completely dependent on maintaining the integrity of relatively heavy, continuous water columns in siphons, and should one of the siphons fail, operation terminates. Many accessories require relatively heavy "solid" water columns, and should a few bubbles collect, for example, as they tend to collect in the tops of inverted U-tube siphons, the efficiency may be seriously impaired. With "solid" water columns, flow is invisible, at least in a practical sense, and failure may go unnoticed until the fish die.

This invention provides for a water circulation system which is particularly adaptable to aquarium accessories, and utilizes the well-known principles of the airlift in such a way that circulation will be self-starting. There is no need for prefilling or priming the accessory, and there are no siphons or water columns which must be set up or maintained to assure continued operation of the accessory. It also provides for extended paths of contact and mixing between the air and water, and yet eliminates undesirable surging and irregular flow.

It is an object of this invention to provide a self-starting water circulation system for circulating aquarium water through aquarium accessories, which system is simple to manufacture, relatively foolproof in operation, and moreover is economical to maintain in operation.

SUMMARY OF THE INVENTION

In accordance with this invention water is positively conveyed from an aquarium to an aquarium accessory by means of an airlift leg submerged in the aquarium, and because the accessory is effectively sealed, the pressure developed therein forces water and air from the accessory back to the aquarium through an exit tube. The exit tube extends down into the accessory container, and a constricted passage allows air from near the top of the accessory container to bleed into the exit tube; the construction developing a back pressure which holds the water level in the accessory safely below the constricted passage, forcing it into the bottom of the exit tube. A stable condition is reached with constant smooth outflow of air and water.

DESIGNATION OF THE FIGURES

DESCRIPTION OF THE PREFERRED EMBODIMENT

Figure 1:
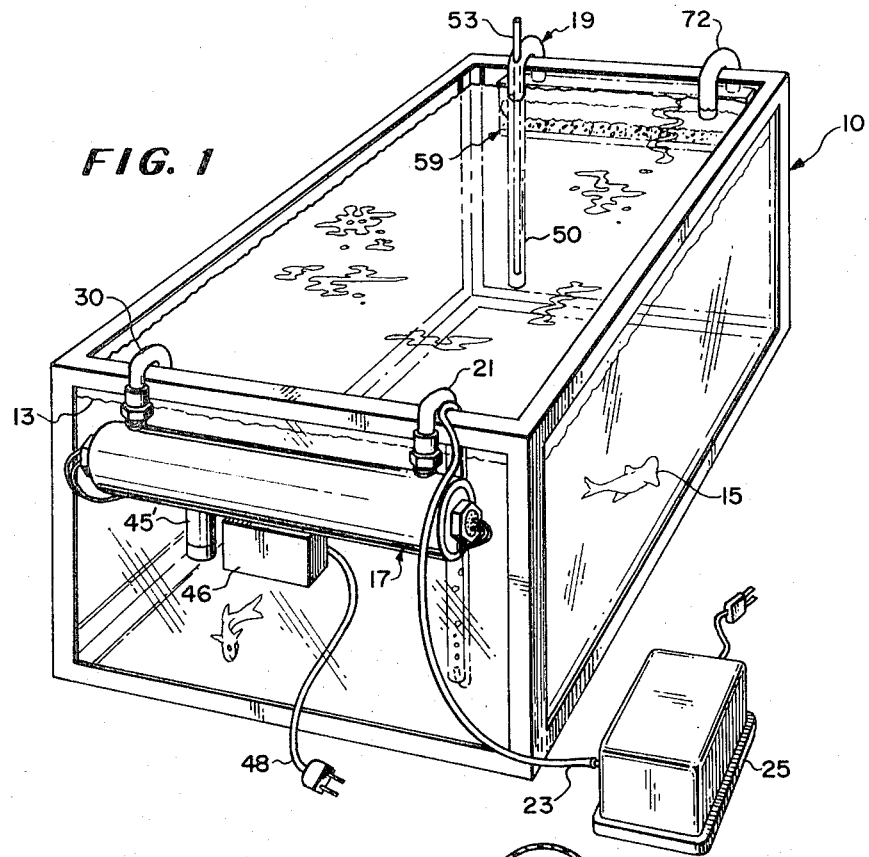
FIG. 1 is a perspective view of an aquarium outfitted with both a germicidal lamp and a filter, both accessories using the circulating system of this invention.

An aquarium, generally 10, is filled with water 11 to an appropriate level 13 to house a collection of fish 15. The water in the aquarium illustrated in the attached drawings is purified by an ultraviolet lamp device 17, and by filter apparatus 19, both of which are in accordance with this invention.

ULTRAVIOLET LAMP

In the improved ultraviolet lamp device 17 of this invention, water of aquarium 10 is lifted through input conduit 21 by means of air bubbles 22 which make conduit 21 an airlift pump, the air being supplied to its end deep in the water of aquarium 10. Air is supplied to conduit 21 by air line 23 conveying air from conventional electrically operated compressor 25. Input conduit 21 is connected through and sealed to the wall 26 of ultraviolet lamp device 17, by means of conventional coupling 27. Also sealed at the top of ultraviolet lamp 17 is coupling 28 which conveys water to exit line 30. It is noted that coupling 28 extends downwardly into chamber 32 within ultraviolet lamp device 17 to a point below the water level 33 therein. Small openings 34 connect the interior exit line 30 with airspace 35 in chamber 32. A germicidal lamp 37 of tubular configuration extends through chamber 32 and is sealed therein by the compression of tightly encircling O-rings 37, 37 by threaded collar 38, 38 (within end-plugs 39, 39) against shoulders 40, 40 on end-plugs 39, 39, respectively. End-plugs 39, 39 closely fit within walls 26, and are sealed thereto, as by a suitable adhesive or solvent. The external electrical connections 41 are preferably insulated. Unless female electrical plugs are provided, connections 41 may be buried by potting or otherwise imbedding in a readily removable material 43, as illustrated at the left end of FIG. 2. The usual starter 45 and ballast 46 may of course be provided.

OPERATION OF ULTRAVIOLET LAMP DEVICE

Air-water mixture is caused to rise in lamp input conduit 21 due to the injection of air bubbles in conduit 21, by pump 25. The resulting mixture of air and water passes into an initially empty chamber 32 (FIG. 2) of lamp device 17 in accordance with this invention, permitting the water to accumulate within chamber 32 and air to vent through exit line 30. However, as water level 33 eventually reaches the lowermost edge 45 of exit water line 30, air in airspace 35 becomes more or less trapped and as additional water and air are discharged into chamber 32 due to the action of the airlift pump, and the air in airspace 35 becomes compressed slightly. This causes the water within exit water tube 30 to rise above water level 33. Air, under compression in airspace, 35, continues to vent through small opening 34 into exit line 30, and the rate at which the pressure in space 35 is relieved depends on the size of opening 34. Generally speaking, the maximum diameter of opening 34 should be inch or less for accessories sized for use in conjunction with a household-type aquarium (e.g., 10 14 18 inch and smaller). With a smaller diameter opening 34, air in airspace 35 passes more slowly into channel 30 and thus the gas in airspace 35 remains under relatively higher pressure causing the water level to be relatively high within exit tube 30. On the other hand, a larger opening 34 results in more rapid venting of airspace 35 and consequently lower resulting pressure in space 35, which lower pressure causes the water level in tube 30 to be relatively lower, i.e., closer to level 33. The water level within tube 30 must eventually reach opening 34, as more water is airlifted into chamber 32. Then air coming into tube 30 through opening 34 generates bubbles 36 within tube 30. The air and water mixture flows through exit tube 30 for return to aquarium 10. This may be called an "airlift," whether there is an ordinary airlift effect in tube 30, or the flow is more directly the result of air pressure on the water in chamber 32, or whether the water is aspirated or entrained in the air jet the difference being is only of theoretical interest.

The constricted opening 34 develops a slight back pressure which determines the position of water level 33 after equilibrium is reached. Whatever hydrostatic pressure may be found in exit line 30 at opening 34, (the pressure needed to raise the exiting water) the air pressure in space 35 will be higher than this by the amount of this back pressure. A smaller opening would lower level 33, a larger opening would raise it.

In each model so far used the exit conduit is small enough (e.g., 7/16 inch ID) so that the airflow through it, from opening 34, is vigorous enough to carry promptly from the exit conduit any water in it that reaches the flowing airstream at exit 34. This may not be necessary but since larger tubes would be more expensive anyway, it seems best to use small exit tubes to be sure that there is never, even at the start of outflow, any high water column in the exit tube to impede the circulation.

During operation of the improved germicidal lamp of this invention the flow of water and air from discharge tube 30 into aquarium 10 is smooth, continuous, uniform and quiet.

In structures in which opening 34 is not present it has been observed that the water-air mixture discharging from tube 30 is erratic in makeup, and its irregular, pulsing or surging character (the flow being made visible by the entrained air bubbles) is distracting and may cause concern as to whether operation is proper. With smooth constant flow, using opening 34, the constant visibility of flow is reassuring, and any interruption would be detectable at a glance.

FILTER DEVICE

An improved aquarium filter device of this invention similarly uses the water circulating system of this invention. In this instance an airlift leg 50 includes conduit 52 and air supply line 53 which passes through sidewall 54 of conduit 52 and terminates slightly above the deeply submerged bottom end 55 of conduit 52. Exterior end 56 of air supply line 53 is hermetically joined to a pressurized air supply (not shown) which can be a system identical to air line 23 and pump 25, for example. In the illustrated embodiment top 57 could be integrally sealed to sidewalls 58, but to permit servicing of the filter is preferably compression-fitted thereto, as illustrated to provide an airtight connection therebetween. Filter 19 thus includes a substantially airtight container 59 having a bottom 60 as well as a perforated false bottom 61 having perforations 62. Resting on perforated false bottom 61 are layers of water filtering and treating materials, e.g., a layer of granular charcoal absorbent 63 and a layer of fibrous filter medium 64. Thus, generally speaking, container 59 may be considered as being divided into two chambers by false bottom 61, namely the upstream, or raw water chamber 67 and the downstream or filtered water chamber 68. It is noted that the layer of fibrous filter medium resides well below water line 70 so that the entire area of the filter medium is available for waterflow through it. None of the air in the incoming air-water mixture comes in contact with the fibrous filter medium during normal operation of the apparatus. Filtered water exit conduit 72 is hydraulically connected to chamber 68 and passes upwardly through chamber 67, and more significantly through airspace 73 to receive air from that space before passing outwardly through top wall 74 and returning to aquarium 11.

The location of the water level, very important for filtering, is determined by constricted opening 76 in the wall of conduit 72 connecting airspace 73 to the interior of conduit 72.

Figure 2:
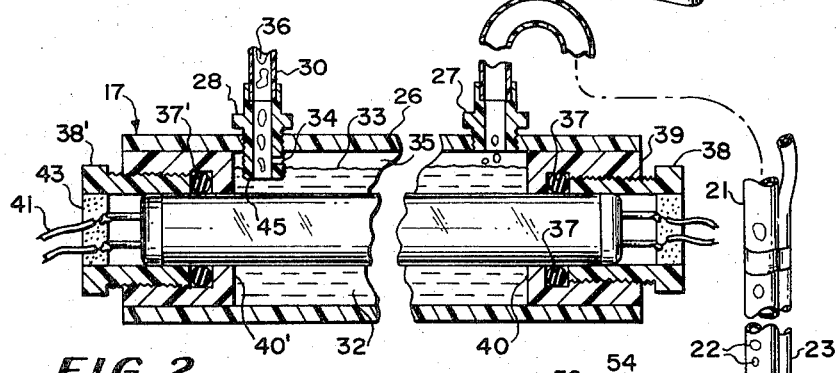
FIG. 2 is a cross-sectional elevational view taken through a vertical midline plane of the germicidal lamp illustrated in FIG. 1.

In FIG. 2 the constricted opening 34 can be only slightly above the water entry for exit tube 30. But in FIG. 3 it must be far above the water entry to tube 72, which is near the bottom of the container 59. In both instances, it is adjacent the top of the container 59. It should be emphasized that container 59, and all connections between container 59 and conduit, 52 and 72 are actually water-and-airtight.

OPERATION OF THE IMPROVED FILTER

Air under pressure from a conventional pump (not shown) enters air line 53 and is discharged into the bottom interior of airlift leg 50, thus causing a water-air mixture to rise within airlift leg 50 and this be conveyed through conduit 52 into filter container 59. Initially the water-air mixture discharges into the empty filter container 59 and collects in chamber 68 and at the bottom of chamber 67, rising gradually as more and more of the water-air mixture are discharged therein. The pressure within airtight-watertight chamber 67 increases at least slightly, because the size of opening 76 is too small to completely vent airspace 73 into tube 72. Consequently the water level within tube 72 will be higher than the water level within chamber 67. As more and more of the water-air mixture is discharged into container 59 the water level in chamber 67 continues to rise and likewise the water level in tube 72 continues to rise until it reaches the level of opening 76. At this point the jet of pressurized air passing through opening 76 into tube 72 generates bubbles and the water and air mixture flows through tube 72 for discharge into aquarium 11, as described previously for the lamp device. At this point or after water level 70 in chamber 67 rises slightly, a status of equilibrium is reached. If the size of opening 76 is small enough to maintain pressurization of airspace 73, water level 70 does not reach opening 76 and remains constant, and the rate of discharge of the air-water mixture from tube 72 also remains uniformly constant and the discharge is relatively quiet.

SERVICING

Inasmuch as filters and lamps need periodic attention, it might have seemed impractical to have sealed containers for them. The illustrated seals, though permitting easy access as needed, are thoroughly reliable in their sealing action. There is no leakage from the germicidal lamp device of FIG. 2. There probably is not leakage from the filter device of FIG. 3, but if there is any it is only air and in too small an amount to make any difference.

ALTERNATIVE CONSTRUCTION

Figure 4:
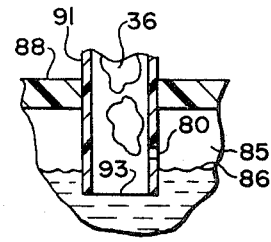
FIGS. 4, 5 and 6 are enlarged cross-sectional schematic views illustrating alternative construction of the exit airlift system used in the accommodation of this invention.
Figure 5:
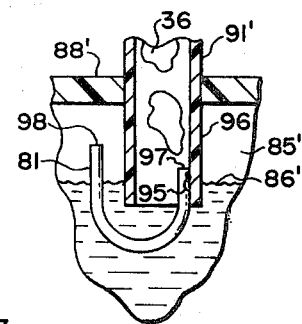
Figure 6:
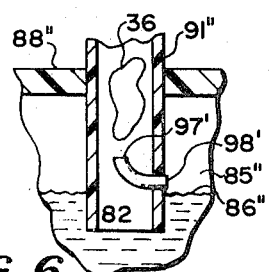

Referring specifically to FIGS. 4, 5, and 6 of the attached drawings, it is noted that passageways 80, 81, 82 connecting airspace 85, 85', 85'' connect the trapped airspace between water level 86, 86', 86'' and filter container top 88, 88', 88'' respectively with the interior of exit tube 91, 91', 91'' respectively.

Figure 3:
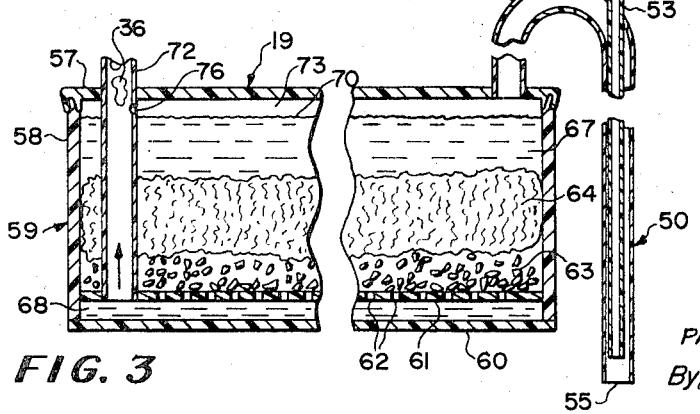
FIG. 3 is a cross-sectional elevational view taken along the vertical midplane of the filter illustrated in FIG. 1.

FIG. 4 is intended to illustrate in greater enlargement the structure substantially in accordance with that disclosed in FIGS. 2 and 3. Opening 80 is simply a small hole in exit tube 91 positioned above end 93 of tube 91 a sufficient distance to permit water level 86 to seal input end 93 of tube 91 from the passage of air through end 93. Passageway 81, on the other hand, is substantially a U-tube generally fixed, as by means of glue joint 95, to wall 96 of tube 91'. It is noted that in the embodiment of FIG. 4 the air discharge end 97 is lower than the air entryway 98. The opposite relationship is present in the embodiment shown in FIG. 5 in which the air discharge end 97' is slightly higher than air input end 98 of passageway 82. It is essential for smooth operation that air discharge end 97, 97' be so positioned as to be reached by the water level in exit tube 91', 91'' while the water level 86', 86'' is between the tube bottom and entry opening 98, 98' of passageway 81, 82 respectively.

As indicated above, generally speaking, the passageway must be approximately 1/80 inch or less in diameter for circulation systems used in connection with aquariums of such size normally encountered in household use. A more general statement is that the air passageway should be sufficiently constricted so that the amount of air supplied by the airlift pump 25 will develop a back pressure, in flowing through this passageway, sufficient to keep the water below the trapped air, e.g., 85', safely below the air entry to the air passageway.

The amount of pressure which, if needed, could be generated in the trapped airspace of the air-type aquarium accessories improved in accordance with this invention is also directly proportional to the depth (more accurately submergence ratio) of the airlift leg in water 11 in aquarium 10. Thus in a commonly encountered household aquarium 12 inches deep, with the water level within an inch of the top rim over which the water must be lifted, an airlift leg extending eight to 10 inches below the water level has been found to be eminently satisfactory for use in accordance with this invention.

ACHIEVEMENT

Aquarium accessories improved in accordance with this invention are self-starting, and are characterized by smooth, nonsurging, efficient, dependable operation. The circulation system of this invention utilizes a conventional air bubbler as its power source, and moreover, provides for maximizing intimate intermixing between the air and the recirculating water stream. The improved airlift circulation system of this invention is readily adaptable to a large variety of aquarium accessories such as filter systems and bacteriacidal lamp equipment. The systems are further characterized by simplicity and economy of manufacture and maintenance of operation.

I claim:

1. A self-starting water circulating system for use in conjunction with an aquarium accessory comprising, in combination:
    an aquarium accessory including a substantially airtight water treatment chamber;
    a water circulation system for circulating water from the aquarium to the treatment chamber and also circulating water from the treatment chamber back to the aquarium, said circulation system including airlift leg means with an inlet below the liquid level of a body of water within said aquarium, means including an outlet constructed and arranged whereby a mixture of air and water is discharged into said water treatment chamber establishing a body of liquid therein with air trapped in a space within said chamber above the liquid level of the body of water in said chamber, means including an exit tube for water within the chamber with its inlet positioned to receive water below the liquid level in said chamber and air passageway means communicating between said space with air trapped therein and the interior of said exit tube whereby the pressure of said trapped air both raises the level of the water in the exit tube to be entrained with air from the air passageway means and provides an airlift leg in said exit tube, outlet means in said exit tube in communication with said aquarium.

2. In an aquarium accessory which includes a water treatment chamber and a water circulation system which circulates water from the aquarium to the treatment chamber and back to the aquarium, the improvement in which:
    the water treatment chamber is substantially airtight, and in which the circulation system includes an airlift leg means with an inlet below the liquid level of a body of water within said aquarium, means including an outlet constructed and arranged whereby a mixture of air and water from the aquarium is discharged into the water treatment chamber establishing a body of liquid therein with air trapped in a space within said chamber above the liquid level of the body of water in said chamber;
    said improvement including chamber exit tube means for conveying water-air mixture back to the aquarium, said means having the end thereof extending a sufficient depth into the chamber to reside below the water level, said exit tube means being provided with an air passageway having an input opening in the airspace, and a discharge opening in the interior of the exit tube, connecting the airspace in the chamber to the interior of the exit tube, said passageway being sufficiently constricted to cause generation of sufficient air back pressure within said airspace to raise the level of the water within the exit tube to a level of entrainment with air from the discharge opening of the passageway when the water level in the chamber remains below the input opening of the passageway.

3. The improved accessory of claim 2 in which the air passageway has a flow cross section at least as constricted as ⅛ inch diameter.

4. An improved filter accessory for use in conjunction with an aquarium, including:
    a substantially airtight water-treatment chamber, said chamber including a water-treatment region, and a treated water region;
    means including an airlift leg for transfer of an air-water mixture into the filter from the aquarium;
    a water-treatment medium positioned in the water treatment region to require water to pass through the medium into the treated water region; water-treatment
    exit water conduit means for conveying water from the treated water region back to the aquarium, said conduit means passing through a trapped airspace at the top of the airtight water-treatment chamber;
    and a relatively constricted air passageway connecting the air in the trapped airspace with the interior of the exit conduit, said passageway having an air entry port in the water-treatment chamber and an air discharge port in the interior of the conduit, said air discharge port being positioned for its air to lift water within said exit conduit means.

5. The improved accessory of claim 4 in which the air passageway has a flow cross section at least as constricted as one-eighth inch diameter.

6. An aquarium accessory having a self-starting water-circulating system including:
    a substantially airtight water-treatment chamber;
    inflow and outflow tubes of generally U-shaped configuration for hanging over an edge of an aquarium, the inflow tube having an inlet below the liquid level of a body of water within said aquarium and being provided with airlift pump means for pumping a mixture of air and water into the treatment chamber;
    the outflow tube extending upwardly from the water-treatment chamber and within the chamber extending downwardly to a water-receiving opening, said outflow tube having a passage for air to flow into it from a level near the top of the space within the water-treatment chamber where air from said mixture accumulates, said passage opening into the tube at substantially said level and being sufficiently constricted compared to the supply of air derived from said airlift pump to maintain uniformity of airflow;
    said outflow tube being of small cross-sectional size to cause the air flowing through said passage and out through said outflow tube to entrain water with it for producing substantially uniform flow of water as an air and water mixture up through the outflow tube.

7. An aquarium accessory having a self-starting water-circulating system including:
    a substantially airtight water-treatment chamber;
    inflow and outflow tubes communicating with said chamber and extending outwardly and downwardly for hanging over an edge of an aquarium, the inflow tube having an inlet below the liquid level of a body of water within said aquarium and being provided with airlift-pump means for pumping a mixture of air and water into the treatment chamber;
    the outflow tube having a passage for air to flow into it from a level near the top of the space within the water-treatment chamber where air from said mixture accumulates, said passage opening into the tube at substantially said level to receive all of the air derived from said airlift pump and being constricted for uniform airflow;
    said outflow tube being of small cross-sectional size to cause the air flowing through said passage and out through said outflow tube to entrain water with it and produce a substantially uniform flow of an air and water mixture through the outflow tube, thereby reaerating the water and making the flow of water visible.

8. An improved germicidal lamp accessory for use in conjunction with an aquarium, said accessory being adapted for use in conjunction with an airlift leg for transfer of a water-air mixture into the accessory from the aquarium, the improvement including:

an elongated tubular member fitted at both ends with means for forming a sealed water-treatment chamber for sealing a tubular germicidal lamp therein;

said accessory including inlet means for discharging in the treatment chamber an air and water mixture from the airlift leg, a vertically rising exit tube extending into a body of water within the confines of the water-treatment chamber, thereby trapping air in an airspace above the body of the water, said exit tube having an air-passageway means for connecting the airspace to the interior of the exit tube;

the passageway means including an air input end and an air discharge end;

said accessory having means, including the construction and positioning of said passageway means, to cause water from the body of water to rise within the exit tube to be entrained with air from the air discharge end and to cause the air input end of the passageway means to be positioned above the water level in the water-treatment chamber during operation whereby the excess air pressure in the chamber provides an airlift leg in the exit tube for returning water to the aquarium.

9. The improved accessory of claim 8 in which the air passageway has a flow cross section at least as constricted as ⅛ diameter.

* * * * *

UNITED STATES PATENT OFFICE
CERTIFICATE OF CORRECTION

Patent No. 3,640,391     Dated February 8, 1972

Inventor(s) Paul David Carpenter, Jr.

It is certified that error appears in the above-identified patent and that said Letters Patent are hereby corrected as shown below:

Column 1, line 57, "construction" should be -- constriction -- .

Column 2, line 27, the paired numbers should read -- 37, 37' -- 38, 38' -- 39, 39' -- .

Column 2, line 28, the paired numbers should read -- 40, 40' -- 39, 39' -- .

Column 2, line 29, the paired numbers should read -- 39, 39'--

Column 2, line 56, before "inch" insert -- 1/8 -- .

Column 2, line 58, "X" (for "by") signs should be inserted for dimensions given, after "10" and "14".

Column 4, line 2, "this" should read -- thus -- .

Column 4, line 65, after "1/8" delete "0".

Column 6, line 16, end of 4th paragraph of claim after "water region;" delete "water treatment".

Column 8, line 15, insert -- inch -- after "1/8".

Signed and sealed this 7th day of November 1972.

(SEAL)
Attest:

EDWARD M. FLETCHER, JR.
Attesting Officer

ROBERT GOTTSCHALK
Commissioner of Patents